United States Patent [19]
Vartti et al.

[11] Patent Number: 5,678,026
[45] Date of Patent: Oct. 14, 1997

[54] MULTI-PROCESSOR DATA PROCESSING SYSTEM WITH CONTROL FOR GRANTING MULTIPLE STORAGE LOCKS IN PARALLEL AND PARALLEL LOCK PRIORITY AND SECOND LEVEL CACHE PRIORITY QUEUES

[75] Inventors: Kelvin S. Vartti, Hugo; Mitchell A. Bauman, Circle Pines, both of Minn.

[73] Assignee: Unisys Corporation, Blue Bell, Pa.

[21] Appl. No.: 579,896

[22] Filed: Dec. 28, 1995

[51] Int. Cl.$^6$ .................................. G06F 13/362
[52] U.S. Cl. ............... 395/479; 395/726; 395/729; 395/551; 395/478
[58] Field of Search ............... 395/405, 447, 395/448, 444, 475, 476, 477, 478, 479, 480, 250, 872, 449, 550, 200.07, 200.08, 200.15, 200.16, 726, 729, 551, 553, 552, 555

[56] References Cited

U.S. PATENT DOCUMENTS

| | | | |
|---|---|---|---|
| 4,733,352 | 3/1988 | Nakamura et al. | 395/479 |
| 4,984,153 | 1/1991 | Kregness et al. | 395/479 |
| 5,218,688 | 6/1993 | Nishida | 395/478 |
| 5,408,629 | 4/1995 | Tsuchiva et al. | 395/478 |

Primary Examiner—Eddie P. Chan
Assistant Examiner—Hiep T. Nguyen
Attorney, Agent, or Firm—Charles A. Johnson; Mark T. Starr

[57] ABSTRACT

A storage lock apparatus for a multiprocessor data processing system. The storage lock apparatus includes control for granting locks to different selectable portions of storage in parallel. In addition, acknowledgment from a remote lock controller is not required for a processor to obtain a lock on an address, even if the address for which the lock was requested is not local relative to the processor. Parallel priority queues are employed for parallel handling of storage lock functions and general storage operations, thereby reducing contention for priority between storage lock operations and general storage operations where there are no addressing conflicts.

16 Claims, 6 Drawing Sheets

LOCK REGISTERS

| | ADRESS AND PARITY BITS | LOCK BIT (L) | REQUEST FORWARD BITS | REQUEST BACKWARD BITS |
|---|---|---|---|---|
| LOCAL IPa | | | | |
| LOCAL IPb | | | | |
| LOCAL IPc | | | | |
| LOCAL IPd | | | | |
| LOCAL I/O | | | | |
| REMOTE IPa | | | | |
| REMOTE IPb | | | | |
| REMOTE IPc | | | | |
| REMOTE IPd | | | | |
| REMOTE I/O | | | | |

FIG.5

| REQUEST FORWARD BITS | REQUESTER |
|---|---|
| 000 | LOCAL IPa |
| 001 | LOCAL IPb |
| 010 | LOCAL IPc |
| 011 | LOCAL IPd |
| 100 | REMOTE IPa |
| 101 | REMOTE IPb |
| 110 | REMOTE IPc |
| 111 | REMOTE IPd |

FIG.6

| REQUEST BACKWARD BITS | REQUESTER |
|---|---|
| 0000 | LOCAL IPa |
| 0001 | LOCAL IPb |
| 0010 | LOCAL IPc |
| 0011 | LOCAL IPd |
| 1000 | LOCAL I/O |
| 0100 | REMOTE IPa |
| 0101 | REMOTE IPb |
| 0110 | REMOTE IPc |
| 0111 | REMOTE IPd |
| 1100 | REMOTE I/O |

FIG.7

MULTI-PROCESSOR DATA PROCESSING SYSTEM WITH CONTROL FOR GRANTING MULTIPLE STORAGE LOCKS IN PARALLEL AND PARALLEL LOCK PRIORITY AND SECOND LEVEL CACHE PRIORITY QUEUES

BACKGROUND

1. Field of the Invention

This invention generally relates to locking portions of addressable memory in a multiprocessor data processing system, and are particularly to an improved priority apparatus for parallel prioritization of general storage requests and storage lock requests, and an improved apparatus for the parallel granting of storage locks.

2. Description of the Prior Art

In data processing systems having multiple processors sharing a common addressable memory, a plurality of programs or processes are executed in parallel. This yields the advantage of increased throughput performance over machines where there is a single processor executing a single process.

Where there are multiple processes cooperating to perform a programmed function, a high level of coordination is necessary to ensure proper operation where resources are shared. One resource which may be shared in multiprocessor data processing systems is addressable memory. It is well known in the art that machine language macro-instructions such as the biased-fetch, test-and-set, increment-and-test, or conditional-replace can be provided to accommodate the sharing of addressable memory. During execution of these instructions, the portion of memory upon which the operation is being performed is exclusively held, or "locked", by the processor executing the instruction; thus, they are referred to as "storage lock instructions." Should another processor attempt to execute a similar type of instruction on the same portion of memory while the first processor has that portion of memory locked, the second processor will be denied access to the storage location until the first processor has completed its exclusive use operation and has released the lock.

Each new generation of data processing systems has brought architectures having more and faster processors to drive the system. With respect to storage lock instructions, each generation has sought to keep the time required to coordinate lock processing to a minimum and maximize system performance.

Two basic approaches to storage lock operations are the "distributed" and "centralized" approaches. In the centralized approach to locking storage, the particular storage unit being locked contains the locking logic, and a lock granted signal must be provided to the processor requesting the lock to indicate that it has exclusive use of the requested storage location. In contrast, the distributed approach places the locking logic within each processor. Where each processor has the locking logic, a high level of coordination between the processors is necessary to ensure that a deadlock situation does not occur.

The distributed approach to processing storage lock instructions is shown in U.S. Pat. No. 4,984,153 issued Jan. 8, 1991 to Glen Kregness et al. for a STORAGE LOCKING CONTROL FOR A PLURALITY OF PROCESSORS WHICH SHARE A COMMON STORAGE UNIT and assigned to Unisys Corporation, wherein each of the processors keeps a copy of each location in the shared storage which is locked by each of the processors. Special arbitration logic is provided to deal with the car where two processors request a lock simultaneously. This approach places the arbitration and locking logic at the processor level of the architecture, and results in lock processing overhead for the processor which is directly proportional to the number of processors in the system. Furthermore, with the point-to-point communications shown, the space required for inter-processor cabling drastically increases as each additional processor requires cables between the it and each processor already in the system.

The LOCK CONTROL FOR A SHARED STORAGE IN A DATA PROCESSING SYSTEM described in U.S. Pat. No. 4,733,352, issued Mar. 22, 1988 to Kouji Nakamura et al. (hereinafter Nakamura), shows a plurality of processors sharing a main storage through a plurality of storage controllers. Each storage controller is coupled to a main storage unit and processes the main storage requests for each of the coupled processors. While the described locking mechanism removes the locking logic from the processors and thereby reduces the cabling between the processors, its locking mechanism has each locking unit maintaining a copy of lock information stored in the other locking unit. When the lock information is duplicated in the lock units, extra logic hardware is required to synchronize the lock operation between each of the lock units.

The SHARED RESOURCE LOCKING APPARATUS described by Starr in the International Patent Application published under the Patent Cooperation Treaty, International Pub. No. WO 83/04117, has a hardware lock unit for limiting concurrent use of shared memory in a data processing system with a bus architecture. The publication shows that where the lock unit is centralized with respect to the resource being locked, logic for coordinating between lock units is unnecessary. When a processor wishes to lock a selected portion of addressable memory, it sends its processor identification, a read command, and an address indicating the memory portion to be locked over the system bus to the shared memory unit. The shared memory unit then checks whether the memory portion indicated is already locked by another processor. If so, the lock request is held and the read from memory is not performed. The requesting processor must await its turn m lock the indicated portion of memory, and the shared memory unit waits until the lock is granted to perform the read operation. Each portion of the shared memory that is to be treated as a separate lockable resource has a lock register. The lock register contains an identifier for the requester currently having the resource locked, and a bit map field indicating which processors have lock requests outstanding for the resource.

U.S. Pat. No. 5,408,629, entitled, APPARATUS AND METHOD FOR CONTROLLING EXCLUSIVE ACCESS TO PORTIONS OF ADDRESSABLE MEMORY IN A MULTIPROCESSOR SYSTEM, to Tsuchiya et al., has lock-control logic is distributed among a plurality of storage controllers, wherein each of the storage controllers controls access to the memory to which it is directly coupled. Each storage controller also has a plurality of processors to which it is directly coupled. Furthermore, each storage controller is directly coupled to each of the other storage controllers, thereby providing a directly coupled processor with indirect access to the addressable memory coupled to another storage controller. A processor seeking access to addressable memory first sends the memory request (an example being a lock-request) to its directly coupled storage controller. If the requested address is in the addressable memory controlled by the directly coupled storage controller, it processes the request. If the requested address is not in its addressable memory, the storage controller must semi the request to the appropriate storage controller. A lock-request is sent to the lock-control logic in the storage controller for which the memory request was requested and processed as described above.

In the system described by Tsuchiya, to process a lock request from a processor where the lock requests addresses storage controlled by an indirectly coupled storage controller (a "remote" storage controller), the processor had to receive a lock grant from the remote storage controller and its lock control logic. This involved gaining access to the remote interface for transmitting the lock request from the local storage controller to the remote storage controller, processing the lock request at the remote storage controller, gaining access to the remote interface for transmitting the lock grant signal back to the local storage controller, and returning the lock grant signal to the requesting processor.

SUMMARY OF THE INVENTION

The Nakamura lock control apparatus does not provide for granting multiple locks to different addresses in parallel. Furthermore, Nakamura cache functions and lock functions are routed through the same priority logic, thereby competing for priority even if there are no addressing conflicts. Tsuchiya provides for the granting of multiple locks to different addresses in parallel, however, lock requests for remote storage involve remote interface delays. Tsuchiya, similar to Nakamura, routes cache functions and lock functions through the same priority logic.

The present invention increases over the prior art the rate at which locks for selectable portions of addressable memory may be granted, it is imperative that storage lock functions (lock requests and lock releases) be accomplished as quickly as possible because the time that a processor spends waiting for a lock to be granted may essentially be wasted. The structure of the present invention provides for locks to be granted in parallel, thereby enhancing lock function performance. In addition, acknowledgment from a remote lock controller is not required for a processor to obtain a lock on an address, even if the address for which the lock was requested is not local relative to the processor. Finally, parallel priority queues are employed for parallel handling storage lock functions and general storage operations (e.g., read and write), thereby reducing contention for priority between storage lock operations and general storage operations where there are no addressing conflicts.

These and other advantages are attained in a multiprocessor data processing system. The exemplary system in which the invention is embodied includes a plurality of processors. Predetermined ones of the processors are directly coupled to a first storage controller, and the other processors are directly coupled to a second storage controller. The storage controllers are coupled together such that the memory controlled by each of the storage controllers is accessible to both of the storage controllers. Relative to a storage controller, the directly coupled processors are local processors, and relative to the directly coupled processors, the directly coupled storage controller is a local storage controller. The storage controller that is not directly coupled to a set of processors is the remote storage controller relative to the indirectly coupled processors, and the processors that are not directly coupled to a storage are remote processors relative to the indirectly coupled storage controller.

Each of the storage controllers is directly coupled to a respective memory subsystem and directly controls access to the portion of system addressable memory provided by the respective subsystem. Each of the storage controllers has a second-level cache that is mappable to all of addressable memory, thereby providing access to all of addressable memory for the processors.

Each of the processors is capable of issuing storage lock functions. A storage lock function may either be a lock request that specifies an address to lock, or a lock release that specifies an address to unlock.

The lock management apparatus in each of the storage controller includes a set of lock registers. Each lock register in the set is associated with a respective one of the local and remote processors and indicates which address is locked by the respective processor. Thus, the set of lock registers is essentially replicated in each of the storage controllers.

Each of the storage controllers also includes a lock priority circuit that is coupled to each of the local processors. The lock priority circuit is capable of receiving lock function codes from the local processors anti presenting the lock function codes from the various local processors in a predetermined order to the unit that processes the lock function code. The predetermined order is first-in-first-out, with a fixed primarily established for lock function codes that were submitted simultaneously.

A lock-register control circuit is coupled to the lock priority circuit for receiving the lock function code selected by the lock priority circuit. The lock-register control circuit is also coupled to the set of lock-registers. Any necessary adjustments to the set of lock-registers based on the received lock function code are made by the lock-register control circuit.

The lock-register control circuit is also coupled to the remote interface between the storage controllers for receiving a lock function code issued from one of the remote processors. Thus, the lock-register control circuit is capable of receiving two lock function codes simultaneously: one from a local processor and another from a remote processor. If there are no address conflicts, the local processor may be granted its lock at the same time that the remote processor is being granted its lock by the remote processor's lock-register control circuit.

A synchronization circuit is disposed between the lock priority circuit and the lock-register control circuit. The synchronization control circuit delays presenting the lock function code that was selected by the lock priority circuit to the local lock-register control circuit until such time as the lock function code is presented on the remote interface to the remote lock-register control circuit. The synchronization circuit ensures that a lock function code is presented to both the local lock-register control circuit and to the remote lock-register control circuit simultaneously.

The lock-register control circuit further includes a priority circuit for selecting, when there is an address conflict, between a lock function code on the remote interface and a lock function code presented by the synchronization circuit. If there is no address conflict between a lock function code from the synchronization circuit and a lock function code from the remote interface, the lock-register control circuit is permitted to process the lock function codes in parallel.

In another aspect of the invention, each of the lock registers contains control bits for maintaining a doubly linked list of processors that are waiting for a lock to be granted for an address. This allows locks to be granted for a single address in the order in which the locks are requested by the processors.

In still another aspect of the invention, parallel priority circuits are employed to minimize contention for priority between storage lock functions and general storage access functions. Each of the storage controllers has a second-level cache priority circuit and a lock priority circuit. The second level cache priority circuit is coupled to each of the local processors for receiving general storage access function codes. The general storage access function codes generally include reading from and writing to the system memory, in addition, the second-level cache priority circuit receives lock function codes specifying a lock release. The lock priority circuit operates in parallel with the second-level cache priority circuit and is coupled to the local processors for receiving lock function codes specifying lock requests from the local processors. The lock priority circuit is also coupled to the second-level cache priority circuit for receiving a lock release lock function code from the second-level cache priority circuit. The lock priority circuit selects a lock function code to forward to the lock-register control circuit. The dual priority circuits minimize contention for priority. General second-level cache requests do not have to wait for priority in competition with lock requests, and lock requests do not have to wait for priority in competition with general storage access function codes. In addition, lock requests gain access to the remote interface with less competition from general storage access function codes.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

FIG. 5 illustrates the fields of the Lock Registers;

FIG. 6 is a table that shows the predetermined bit-codes for the pointer bits of the Request Forward Bits;

FIG. 7 is a table that shows the predetermined bit-codes for the pointer bits of the Request Backward Bits.

DETAILED DESCRIPTION

Figure 1:
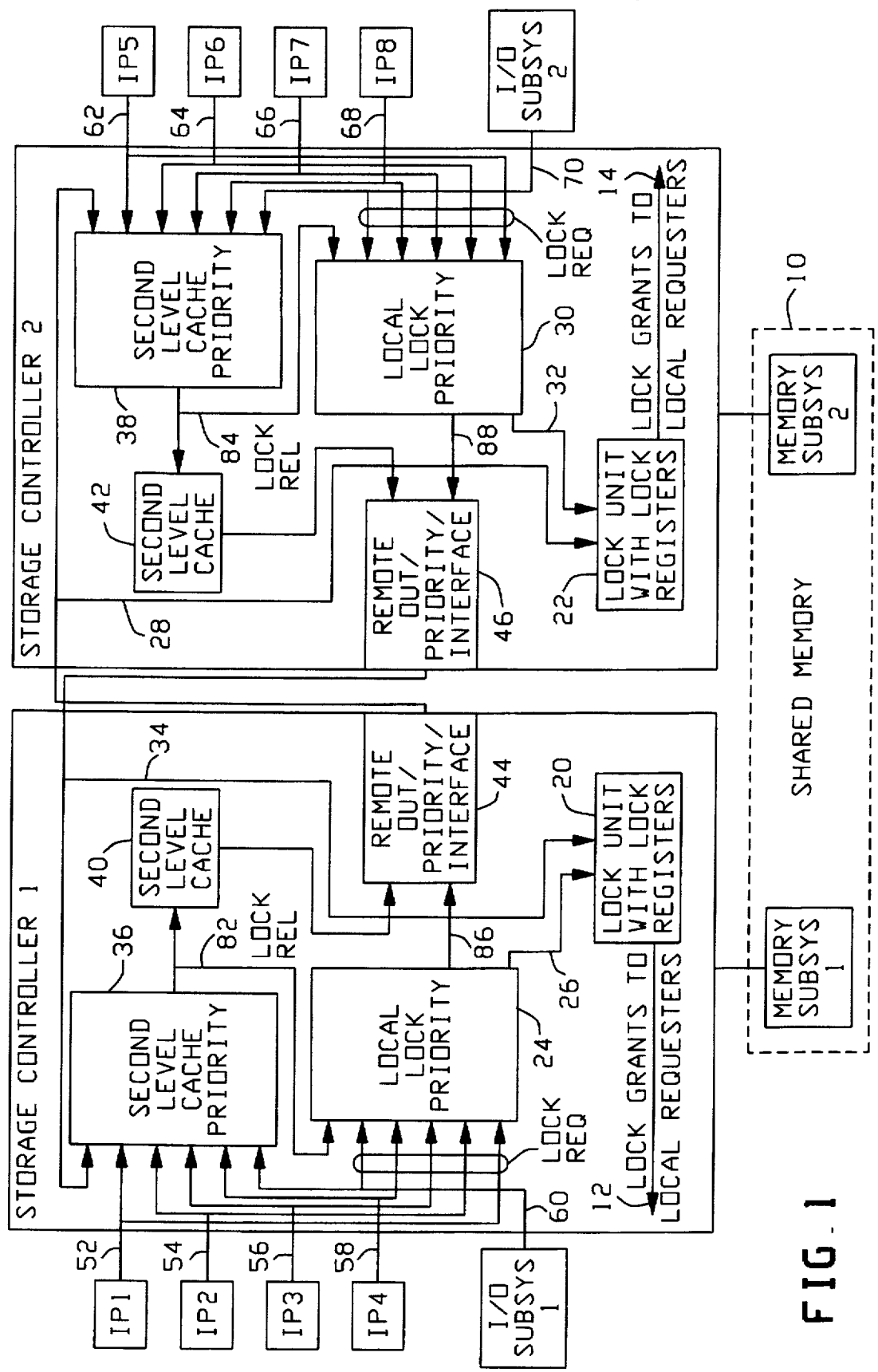
FIG. 1 is a block diagram of a multi-processor data processing system in which the present invention is embodied.

FIG. 1 is a block diagram of a multi-processor data processing system in which the present invention is embodied. The system includes eight Instruction Processors, IP1, IP2, IP3, IP4, IP5, IP6, IP7, and IP8, and two I/O subsystems: I/O Subsystem 1 and I/O Subsystem 2. The total available addressable memory is designated by Shared Memory 10. The Shared Memory is comprised of two Memory Subsystems: Memory Subsystem 1 and Memory Subsystem 2. Each of IP1–IP8 provides instruction execution for programs stored in Shared Memory, and each is functional to call instructions from the Shared Memory. IP1–IP8 respectively execute the instructions, and, in general, do data manipulation.

The system has two Storage Controllers: Storage Controller 1 and Storage Controller 2. Each of Storage Controllers is directly coupled to four IPs and to an I/O Subsystem. IP1, IP2, IP3, IP4, and I/O Subsystem 1 are coupled to Storage Controller 1, and IP5, IP6, IP7, IP8, and I/O Subsystem 2 are coupled to Storage Controller 2. Each of the Storage Controller provides access to a respectively coupled one of the Memory Subsystems. Storage Controller 1 provides access to the addressable memory of Memory Subsystem 1, and Storage Controller 2 provides access to Memory Subsystem 2. While it is not explicitly shown, it should be understood that Storage Controller 1 is coupled to Storage Controller 2 for the purpose of making all of Shared Memory 10 accessible to all of IP1–IP8 and by both of the I/O Subsystems.

In the lexicon of the present invention, IP1, IP2, IP3, IP4, and I/O Subsystem 1 are local requesters relative to Storage Controller 1. Similarly, IP5, IP6, IP7, IP8, and I/O Subsystem 2 are local requesters relative to Storage Contro IP7, IP8, and I/O Subsystem 2 are remote, and relative to Storage Controller 2, IP1, IP2, IP3, IP4, and I/O Subsystem 1 are remote.

A primary function of Storage Controllers 1 and 2 is to manage the data request traffic and data traffic of the system. Assuming a cache-miss in the second-level cache, a request for access to Memory Subsystem 1 is processed by Storage Controller 1, and requests for access to Memory Subsystem 2 are processed by Storage Controller 2. A request by IP1 for access to Memory Subsystem 2, again assuming a miss in the second-level cache, is routed by Storage Controller 1 to Storage Controller 2, and any requested data follows a reverse path.

Storage Lock is a hardware mechanism that guarantees exclusive use of a memory location by a requester (IP1–IP8, I/O Subsystem 1, or I/O Subsystem 2). When a requester has a location locked, another requester cannot access that location with another storage lock request. A location that is locked is not completely locked. That is, the location may be read and written by requesters that do not own the lock.

Lock requests can come from IP1–IP8 and from I/O Subsystems 1 and 2. In the exemplary embodiment, when a IP initiates a lack request, the IP either issues a Read with Lock request or a NOP-Read with Lock request. The particular type of lack request depends upon whether the referenced address is present in the first-level cache (not shown) of the requester. If the requested address is present in the requester's first-level cache, a NOP-Read with Lock request is issued, otherwise a Read with Lock request is issued. The requester waits for a Lock Granted signal 12 or 14 from its respective local Lock Unit 20 or 22. When a lack granted signal is received, the requester may modify the location with a write operation. The lack operation is terminated by issuing a NOP-Write with Lock Release request. For brevity, when a requester seeks to lock a location in Shared Memory, the requester will issue a lock request, and when a requester no longer needs the exclusive lock, a lock release is issued.

An I/O Subsystem requester always initiates a storage lock operation by issuing a Read with Lock request. The I/O Subsystem will receive either a Lock Granted signal or Lock Denied signal from the respective Lock Unit 20 or 22. If a Lock Granted signal is received, the I/O Subsystem may modify the locked location with a Write request and then terminate the lock with a lock release. If a Lock Denied signal is received, the I/O will terminate the lock operation and attempt to lock the location at a later time.

The lock logic architecture shown in FIG. 1 has two advantages. First, locks may be granted in parallel so long as there are not conflicting lock requests. Second, a lock requester is quickly granted a lock if there are not conflicting lock requests.

Locks may be granted in parallel with the Lock Units 20 and 22. Lock Unit 20 is dedicated to returning Lock Grant signals 12 to its local requesters (IP1–IP4 and I/O Subsystem 1), and Lock Unit 22 is dedicated to returning Lock Grant signals 14 to its local requesters (IP5–IP8 and I/O Subsystem 2). Each of the Lock Units has a set of Lock Registers (described in more detail later). The Lock Registers contain addresses that are locked or waiting to be locked by the respective requesters, both for local requesters and for remote requesters.

The presentation of a lock request to each of the Lock Unit 20 and 22 is synchronized. That is, the presentation of a lock request from Local Lock Priority 24 to Lock Unit 20 as shown by line 26 is synchronized with the presentation of the same lock request to Lock Unit 22 via the remote interface line 28. This ensures that at the same time that the Lock Unit 20 is searching its Lock Registers for the requested address, the Lock Unit 22 is searching its Lock Registers for the requested address. The synchronization also allows Lock Unit 22 to process, in parallel, a lock request from one of its local requesters (IP5–IP8 or I/O Subsystem 2) as presented by Lock Priority 30 on lock request line 32. It should be noted that Local Lock Priority 30 synchronizes the presentation of a lock request via Line 32 with the presentation of the same lock request to the remote Lock Unit 20 via Line 34.

Each of the Storage Controllers 1 and 2 respectively includes two separate priority circuits: a Second Level Cache Priority circuit 36 and 38, and a Local Lock Priority circuit 24 and 30. The dual priority circuits allow lock requests to be given a high priority while minimizing the impact on general read and write requests to the Second Level Caches 40 and 42. The Local Lock Priority circuit is dedicated solely to lock requests, while the Second Level Cache Priority circuit is dedicated to all other requests for access to the addressable memory provided by the Shared Memory 10. Because of the replicated implementation of the Lock Registers, a lock request always results in a request to the respective Remote Out Priority circuit 44 or 46, whereas general cache requests do not always result in requests to the Remote Out Priority circuits (e.g., for access to a remote memory address or cache coherency). The Second Level Cache Priority 36 gives incoming requests from the IPs access to the Second Level Cache 40 on a first-in-first-out basis.

Requests from the IPs are routed to the appropriate priority circuit in the respective Storage Controller 1 or 2. IP1–IP4 and I/O Subsystem 1 are respectively coupled to both the Second Level Cache Priority circuit 36 and Local Lock Priority circuit 24 via request Lines 52, 54, 56, 58, and 60. Similarly, IP5–IP8 and I/O Subsystem 2 are respectively coupled to both the Second Level Cache Priority circuit 38 and Local Lock Priority Circuit 30 via request lines 62, 64, 66, 68, and 70. The request Lines 52–70 includes lines for function codes and addresses.

The Local Lock Priority circuit 24 selects either a Lock Request or Lock Release from one of the local requesters IP1–IP4 or I/O Subsystem 1. It should be noted that Lock Requests are made available for priority selection by the Local Lock Priority directly from the local requesters. However, Lock Releases are delayed in being presented to the Local Lock Priority circuit as respectively shown by Lines 82 and 84. Lock Releases are not directly routed to the Local Lock Priority circuit because the release of the lock must wait until cache coherency searches of second level cache tags and duplicate tags (not shown) are complete. The Second Level Cache Priority logic is responsible for holding the release request until cache coherency searches are complete for any previous write operations by the requester. Once either a Lock Request or a Lock Release is selected by the Local Lock Priority, it is routed to the Remote Out Priority circuit 44 via Line 86. In Storage Controller 2, Line 88 routes a lock function from Local Lock Priority 30 to Remote Out Priority circuit 46.

Figure 2:
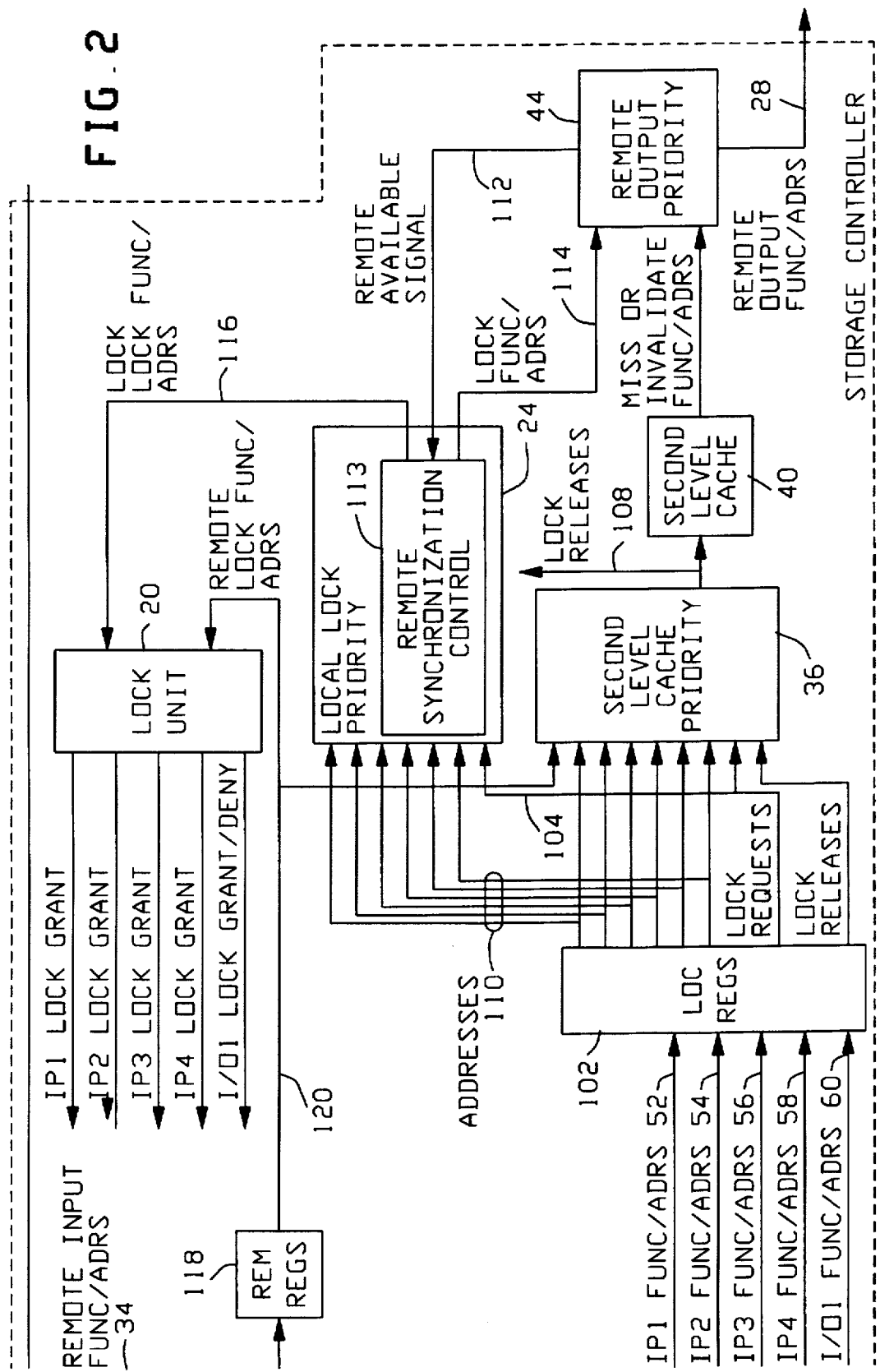
FIG. 2 is a more detailed view of the lock management circuitry within a Storage Controller.

FIG. 2 is a more detailed view of the lock management logic circuitry within a Storage Controller. Lock requests from the local requesters (IP1–IP4 and I/O Subsystem 1) are decoded and latched in a set of Local Registers 102. The Local Registers consist of separate registers for read requests and write requests. Recall that a Lock Request is either a NOP-Read with Lock request or a Read with Lock request and a Lock Release is a NOP-Write with Lock Release request. Thus a Lock Request is latched in a read register and a Lock Release is latched in a respective one of the write registers. Lock Requests are routed to both the Local Lock Priority 24 and the Second Level Cache Priority 36 as shown by signal Line 104 because a Lock Request may also involve a read operation. Lock Releases, on the other hand, are only routed to the Second Level Cache Priority 36 as shown by signal Line 106. Lock Releases are routed to the Local Lock Priority from the Second Level Cache Priority via signal Line 108. Lock Release are routed through the Second level Cache Priority before being routed to the Local Lock Priority to allow for any necessary cache coherency operations to complete. Addresses from Lock Requests and Lock Releases are routed to the Local Lock Priority 24 as shown by address Lines 110.

The Local Lock Priority 24 selects either a Lock Request or a Lock Release for further processing by the Lock Unit 20. The selection is made when the Remote Output Priority 44 indicates that the remote interface is available to send the selected lock function to the remote Storage Controller via the Remote Available Signal line 112. When the remote interface is available, the Local Lock Priority circuit selects a lock function and a Remote Synchronization Control circuit 113 within the Local Lock Priority routes the lock function and address via signal Line 114 to the Remote Output Priority circuit and synchronizes the sending of the lock function to the Lock Unit 20 with the time that the remote Lock Unit 22 will receive the lock function to process. Signal Line 116 makes the lock function and address available to the local Lock Unit 20.

A request from a remote Storage Controller is decoded and latched in the Remote Registers 118. There are a read register and a write register for remote requests. The address and lock function are routed to the Lock Unit 20 via signal Line 120.

Figure 3:
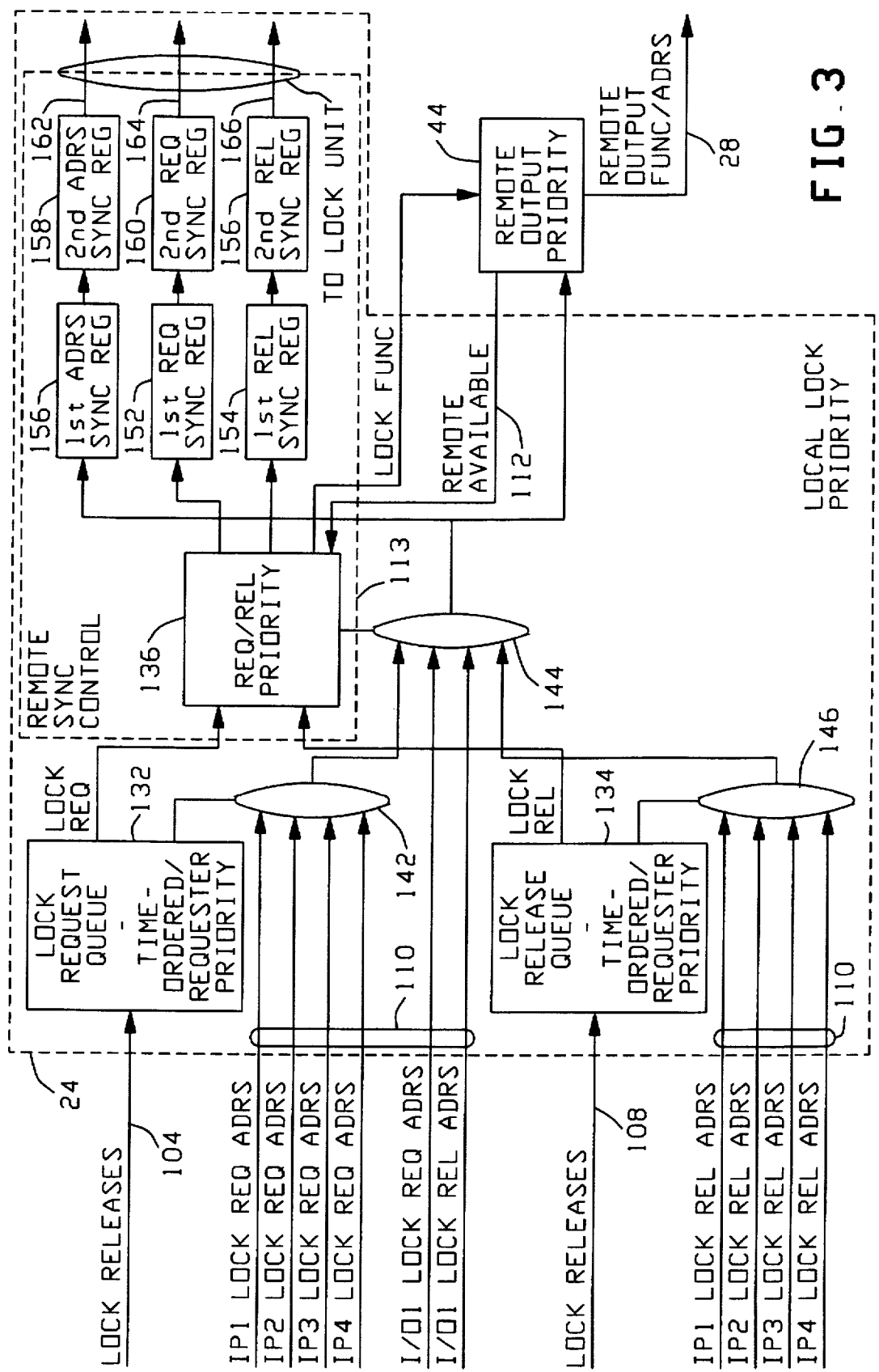
FIG. 3 is a more detailed view of the Local Lock Priority Circuit.

FIG. 3 is a more detailed logic circuit view of the Local Lock Priority Circuit 24. The Local Lock Priority circuit selects either a Lock Request or a Lock Release for processing by the Lock Unit 20. The Local Lock Priority also includes a Remote Synchronization Control circuit for ensuring that the selected lock function is presented to the local Lock Unit at the same time that the lock function is presented to the remote Lock Unit 22.

The Local Lock Priority circuit 24 includes a Lock Request Queue logic circuit 132 for selecting a Lock Request, a Lock Release Queue logic circuit 134 for selecting a Lock Release, and a Request/Release Priority logic circuit 136 for selecting between a competing Lock Request and a Lock Release.

The Lock Request Queue 132 receives Lock Request signals 104 from each of the input interfaces for the local requesters IP1–IP4 and I/O Subsystem 1. The Lock Request Queue consists of a 5×5 matrix of bit registers (not shown). Each column is dedicated to one of the local requesters, and each row is dedicated to the time that the Local Lock Priority received a Lock Request from the requester's interface logic. The Lock Requests signal line 104 consists of five signal lines, one for each of the local requesters. The signals are latched in a respective one of the bit registers in the first row of the matrix. The bit registers of all five columns may be set if all the requesters send a Lock Request at the same time. As one of the competing Lock Requests is selected and new Lock Requests are received, the Lock Requests are advanced forward row-by-row. Five rows are required because there are five local requesters IP1, IP2, IP3, IP4, and I/O Subsystem 1, all of which may simultaneously send a Lock Request. The highest row with a Lock Request present is selected, and then one of the requesters within the row is selected based on a fixed priority. From highest to lowest, the fixed priority is I/O Subsystem, IPa, IPb, IPc, and IPd, where a, b, c, and d are respectively IP1, IP2, IP3, and IP4 in the case of Storage Controller 1, and IP5, IP6, P7, and IP8 in the case of Storage Controller 2. Once a requester is selected, the entire column for the requester is cleared in the matrix.

A Lock Request selected by the Lock Request Queue circuit 132 is routed to the Request/Release Priority circuit 136. In addition, a requested address is selected at Selector 142 and routed to Selector 144. Lock Requests from the I/O Subsystem are routed directly to Selector 144.

The Lock Release Queue 134 is structured similar to the Lock Request Queue 132. However, Lock Releases are not directly routed from the requester interfaces to the Local Lock Priority. Lock Releases are first routed to the Second Level Cache Priority 36. This is done because the Second Level Cache Priority must hold a Lock Release until cache coherency operations are complete for any previous write request that the requester had made. Then the Second Level Cache Priority sends the Lock Release m the Lock Release Queue.

The Lock Release signal line 108 consists of five signal lines, one for each of the local requesters. The signals are latched in the respective one of the bit registers in the first row of the matrix. The bit registers of all five columns may be set if all requesters sent a Lock Release at the same time and all cache coherency operations are complete for the previous write request that the respective requester had made. As one of the competing Lock Release is selected and new Lock Release are received, the Lock Release are advanced forward row-by-row. Five rows are required because there are five local requesters IP1, IP2, IP3, IP4, and I/O Subsystem 1, all of which may simultaneously send a Lock Release or may simultaneously have their cache coherency operations complete. The highest row with a Lock Release present is selected, and then one of the requesters within the row is selected based an a fixed priority. The fixed priority for simultaneous Lock Releases is I/O, IPa, IPb, IPc, and IPd. A Lock Release address is selected via Selector 146 by the Lock Release Queue and routed to Selector 144, and the selected Lock Release is routed to the Request/Release Priority circuit 136.

The priority of the Request/Release Priority circuit 136 is to select a Lock Release over a Lock Request. The particular lock function is selected when the Remote Output Priority circuit 44 indicates via the Remote Available signal Line 112 that the remote interface is available. The Request/Release Priority then selects one of the addresses input to Selector 144 and routes the lock function to the Remote Output Priority. Note that for the lock function provided to the Remote Output Priority a different predetermined lock function code (Lock Request or Lock Release) is assigned for each of the requesters IPa–IPb and the I/O Subsystem.

When the Remote Available signal 112 is set, the Request/Release Priority circuit 136 also begins staging the selected request to the local Lock Unit 20. If a Lock Request is selected, it is routed to the First Request Sync. Register 152, if a Lock Release is selected, it is routed to the First Release Sync. Register 154. The First Address Sync. Register 156 is enabled and loaded with the address selected at Selector 144. The number of staging registers, in this embodiment two, coincides with the time required to get the lock function to the remote Lock Unit.

Note that if the Request/Release Priority circuit selects a Lock Release over a simultaneous Lock Request, the Lock Release is loaded into the first Release Sync. Register, and when the Remote Output Priority circuit 44 indicates via the Remote Available signal 112 that the remote interface is available after having sent the Lock Release, the Second Release Sync. Register 156 is loaded with the Lock Release, and the First Request Sync. Register 152 is loaded with the Lock Request. The address of the Lock Release is loaded into the second Address Sync. Register 158 as the address of the Lock Request is loaded into the First Address Sync. Register 156. A second Request Sync. Register 160 gets loaded with the Lock Request at the appropriate time to synchronize the arrival of the Lock Request at the local Lock Unit 20 with the same Lock Request at the remote Lock Unit 22.

Signals tin Line 162 carry the address of a Lock Request to the local Lock Unit 20, signals on Line 164 carry a Lock Request to the local Lock Unit 20, and signals on Line 166 carry a Lock Release to the local Lock Unit. Note that Lock Requests and Lock Releases identify the requesters issuing the lock functions.

Figure 4:
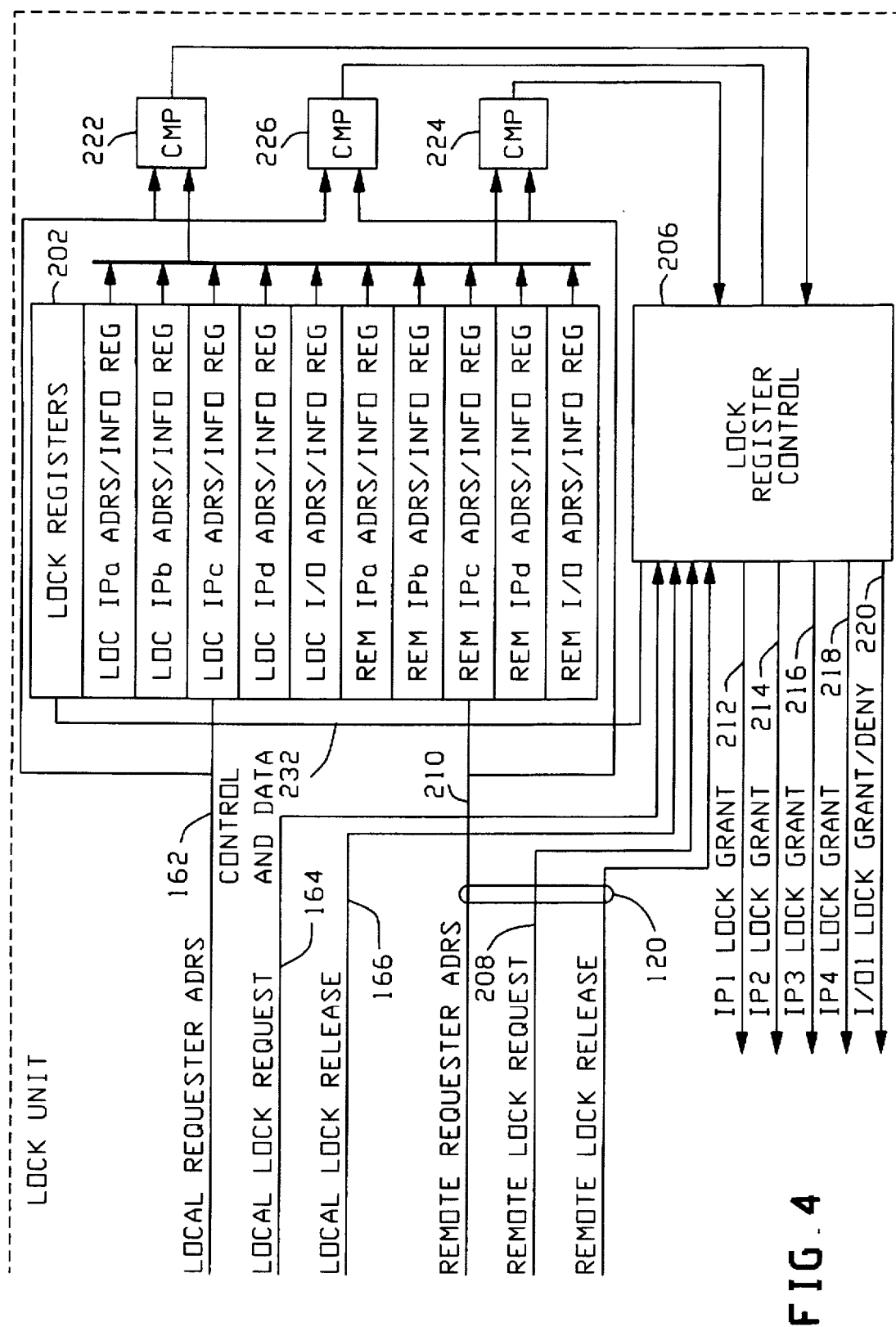
FIG. 4 is a block diagram of a Lock Unit.

FIG. 4 is a logic block diagram of a Lock Unit. Each of Storage Controller 1 and Storage Controller 2 has a respective Lock Unit 20 and 22 for storing and managing lock information. A primary feature of the Lock Unit is the set of Lock Registers 202. There is a respective register for each of the local and remote requesters. The contents of the Lock Registers of Lock Unit 20 are synchronized with the contents of the Lock Registers of Lock Unit 22. Each of the Lock Registers holds an address that is locked by the respective requester or for which the requester is waiting for a lock, and information for granting a lock to another requester waiting for a lock on the specified address. The remainder of FIG. 4 will be discussed in along with FIGS. 5, 6, and 7.

FIG. 5 illustrates the fields of the Lock Registers. The Address and Parity Bits field contains the requester address bits of the Lock Request. With respect to FIG. 4, the address field of a lock register for a respective one of the local requesters is loaded with the address on Line 162 when a Lock Request is present tin Line 164, and the address field of a lock register for a respective one of the remote requesters is loaded with the address on Line 210 when a Lock Request is present on Line 208.

The Lock Bit of a lock register, when set, indicates that the respective requester presently has the address locked. When a Lock Request is presented to the Lock Unit 20, no other requester has the address on Line 162 locked, and a remote Lock Request is not present on Line 208 with a remote Lock Request address on Line 210 that is equal to the address of the local Lock Request on Line 162, the Lock bit is set. If a remote requester is trying to lock an address at the same time that a local requester is trying to lock the same address (e.g., IP5 is trying to lock the same address as IP1), a predetermined priority governs which requester will be granted the lock. In the exemplary embodiment, IP1, IP2, IP3, IP4, and I/O Subsystem 1 have priority over IP5, IP6, IP7, IP8, and I/O Subsystem 2. When the Lock Bit is set, the Lock CAM Control circuit will issue a lock grant signal to the respective local requester. Signal Lines 212, 214, 216, 218, and 220 show the respective lock grant signals.

A Lock Release on signal Line 166 results in the clearing of the Lock Bit in the respective lock register.

The Lock Register Control logic circuit 206 maintains a doubly linked list of requesters that are waiting to be granted a lock. The doubly linked list is maintained using the Request Forward Bits and the Request Backward Bits of the registers in the Lock Registers 202. Lock Requests are entered on the list in the order that they arrive at the Lock Unit 20 and locks are granted on a first-in-first-out basis.

The Request Forward Bits are used to indicate that another requester has issued a Lock Request for an address that is currently locked. The bits reference the next requester that will be granted the lock when the current requester releases the lock. The Request Forward Bits are also used in combination with the Request Backward Bits to adjust the contents of the Lock Registers 202 when a requester is dynamically removed from the system.

The Request Forward Bits consist of two parts, a valid bit and pointer bits. Bit 0 is the valid bit (not shown) that when set indicates that bits 1–3 contain a valid pointer to the next requester that issued a Lock Request for the address in the address portion of the lock register. The pointer bits reference the next requester that will be granted the lock. The Request Forward Bits allow locks to be granted to pending Lock Requests in the order that the Lock Register Control logic circuit 206 received the Lock Requests.

When an IP issues a Lock Request for an address that is currently locked, the Request Forward Bits for the requester are stored in the lock register whose address field matches that on address Lines 162 or 210 and that has its valid bit, bit 0 of the Request Forward Bits, clear. Note that in the exemplary embodiment, if a Lock Request is received from an I/O Subsystem and the address is presently locked, the I/O Subsystem receives a lock denied signal from its local LockRegister Control 206 instead of queuing the Lock Request.

When the requester that currently holds the lock issues a Lock Release, the valid bit of the Request Forward Bits field is checked, and if set, the Request Forward Bits 1–3 are used to identify the next requester that will be granted the lock. The Lock Register Control 206 then sets the Lock Bit of the requester referenced by the Request Forward Bits and issues a Lock Grant if the requester is a local requester. The Request Forward Bits and Lock Bit of the requester that issued the Lock Release are cleared in the respective lock register.

FIG. 6 is a table that shows the predetermined bit-codes for the pointer bits of the Request Forward Bits. Note that a unique code identifies each of the local and remote requesters, and that there are no codes for either of the local or remote I/O Subsystems. This is because in the exemplary embodiment, the I/O Subsystems receive a lock denied signal as shown on signal Line 220 of FIG. 4 when the requested address is locked at the time that the Lock Request is processed by the Lock Register Control 206.

The Request Backward Bits of the lock registers of FIG. 5 are used by the Lock Register Control 206 to reference to the previous requester that issued a Lock Request for the address in the register. The Request Backward Bits are used in combination with the Request Forward Bits to identify the last requester that issued a Lock Request for an address and to adjust the contents of the Lock Registers 202 when requesters are dynamically removed from the system. The Request Backward Bits field consist of two pans, a valid bit (not shown) and pointer bits. Bit 0 of the Request Backward Bits is the valid bit and indicates that the pointer bits (1–4) contain a valid pointer.

FIG. 7 is a table that shows the predetermined bit-codes for the pointer bits of the Request Backward Bits. Note that a unique code identifies each of the local and remote requesters. When a Lock Request is present on either of Lines 164 or 208 and the Lock Request is from one of the IPs, and the address on the respective address Line 162 or 210 is currently locked, the Request Backward Bits are updated in the respective lock register of the requester. The Request Backward Bits are updated to reference the requester whose lock register address field matches that of the present Lock Request and whose Request Forward valid bit and Request Backward valid bit are clear. Where both the valid bits of the Request Forward Bits field and the Request Backward Bits field are clear, the requester is that which last issued a Lock Request for the address.

The Request Backward Bits are cleared when the respective requester is granted the lock, that is when the requester referenced by the Request Backward Bits issues a Lock Release.

When the requester that currently holds the lock issues a Lock Release, the valid bit of the Request Forward Bits field is checked. If the valid bit is set, the requester referenced by the Request Forward Bits is granted the lock by its local Lock Register Control 206, and the Request Backward Bits field of the requester being granted the lock are cleared.

Returning to FIG. 4, the Compare circuits 222, and 224 compare the address of a Lock Request to the addresses stored in the Lock Registers 202. The outputs of the Compare circuits are used by the Lock Register Control 206 to determine if the requested address is unique. Note that while it is not shown, Compare circuit 222 is comprised of ten individual compare circuits, one for each of the Lock Registers. The same is true for Compare Circuit 224. Compare circuits 222 and 224 are used to determine whether the address of the present Lock Request is for an address which is already locked.

Compare circuit 226 compares the address of a local Lock Request on Line 162 to the address of a remote Lock Request on Line 210. The output of Compare circuit 226 is used to detect a conflict between a local requester and a remote requester trying to lock the same address.

The Lock Register Control logic circuit 206 controls the write enables to each of the Lock Registers 202 and resolves conflicts between local and remote Lock Requests. Line 232 supplies write enables and data (for the Lock Bit, Request Forward Bits, and Request Backward Bits) to the respective Lock Registers.

The address field of a respective Lock Register is written each time that the Lock Register Control 206 receives a Lock Request, on either of Lines 162 or 210.

The Lock Bit field in a respective Lock Register is enabled and set when a requester is granted a lock and is cleared when a requester releases a lock. When a local or remote requester issues a Lock Request for an address that is not present in any of the Lock Registers 202, and there is no conflict between a local Lock Request and a remote Lock Request as per Compare circuit 226, the Lock Bit field is set. The Lock Bit field is also set when a lock is released and another requester is waiting for the lock.

The Request Forward Bits field is enabled and written when a local or remote IP requester issues a Lock Request for an address that is currently locked. The bits are cleared when the local or remote requester issues a Lock Release. The Request Forward Bits are set in the respective one of the Lock Registers 202 for the requester that last issued a Lock Request that the present local or remote IP requester is attempting to lock. The local or remote IP that last issued a Lock Request for the address of the current Lock Request is determined by a Lock Register with a set Lock Bit and having invalid Request Forward Bits (i.e., one requester having locked the address and no others waiting for the lock), or having valid Request Backward Bits and invalid Request Forward Bits (i.e., others waiting for the lock). The data for the Request Forward Bits is defined in the table of FIG. 6. The Request Forward Bits are cleared in the respective one of the Lock Registers 202 for the local or remote requester that issued a Lock Release.

The Request Backwards Bits field is enabled and written when a local or remote IP requester issues a Lock Request and the requested address is currently locked by another requester (either IP or I/O). The proper bit-code from the table of FIG. 6 is written in the Request Backwards Bits field of the present local or remote IP requester. The Request Backward Bits are cleared when the lock is granted to the requester that was waiting for the lock.

The Lock Register Control circuit also resolves a conflict between addresses on the local address Line 162 and the remote address Line 210. Conflicts are resolved by assigning one of the Storage Controllers, 1 or 2, a higher priority. This is accomplished with a scan only designator which is set to an opposite state in each of the Storage Controllers. The designator is referred to as the SC-priority designator. The Storage Controller with the set designator has priority over the other Storage Controller. The four types of conflicts are as follows: (1) a local and remote requester are trying to lock the same address at the same time and no other requester have the address locked; (2) a local and remote requester are trying to lock the same address at the same time and another requester has the address locked; (3) the local requester wants to lock the same address that the remote requester is releasing and there are no other requesters waiting to lock the address; and (4) the local requester wants to lock the same address that the remote requester is releasing and there are other requesters waiting to lock the address.

Local/Remote Lock Conflict for an Unlocked Address

If a local and remote requester are trying to lock the same address at the same time and no other requester have the address locked, the SC-priority designator determines which requester will be granted the lock. The following actions are taken by the Lock Register Control of the Storage Controller whose SC-priority designator is set, i.e., the local requester has priority:

The respective addresses of the local and remote addresses are written in the respective ones of the Lock Registers 202.

The Lock Bit in the lock register of the local requester is set. A lock granted signal is sent to the local requester.

If the remote requester is an IP, it must wait for the lock and the Request Forward Bits of the lock register of the local requester are written with the identifier code for the remote requester, and the Request Backward Bits of the lock register of the remote requester are written with the identifier code for the local requester.

If the remote requester is an I/O, no actions are taken for the remote requester because a lock denied signal will be issued by the remote Lock Register Control.

The following actions are taken by the Lock Register Control in the Storage Controller where the remote requester has priority:

The respective addresses of the local and remote addresses are written in the respective ones of the Lock Registers.

The Lock Bit in the lock register of the remote requester is set.

If the local requester is an IP, it must wait for the lock and the Request Forward Bits of the lock register of the remote requester are written with the identifier code for the local requester, and the Request Backward Bits of the lock register of the local requester are written with the identifier code for the remote requester.

If the local requester is an I/O, a lock denied signal is returned to the local I/O Subsystem, and no further actions are taken.

Local/Remote Lock Conflict for a Locked Address

If a local and remote requester are trying to lock the same address at the same time and another requester has the address locked, the following actions are taken by the Lock Register Control in the Storage Controller where the local requester has priority:

The respective addresses of the local and remote addresses are written in the respective ones of the Lock Registers.

If the local requester is an IP, it must wait for the lock, and the Request Forward Bits in the lock register of the requester that last issued a Lock Request for the address are written with the bit-code of the local requester. The Request Backward Bits in the lock register of the local requester are written with the bit-code of the requester that last issued a Lock Request for the address.

If the local requester is an I/O, the lock is rejected and a lock denied signal is returned.

If the remote requester is an IP, it must wait for the lock. The Request Forward Bits in the lock register of the requester that last issued a Lock Request for the address are written with the bit-code of the remote requester. The Request Backward Bits in the lock register of the remote requester are written with the bit-code of the requester that last issued a Lock Request for the address. Note that if the local requester is an IP, the local requester will be the requester that last issued a Lock Request.

If the remote requester is an I/O, no action is taken for the remote request.

The following actions are taken in the Storage Controller where the remote requester has priority:

The respective addresses of the local and remote addresses are written in the respective ones of the Lock Registers.

If the remote requester is an IP, it must wait for the lock, and the Request Forward Bits in the lock register of the requester that last issued a Lock Request for the address are written with the bit-code of the remote requester. The Request Backward Bits in the lock register of the remote requester are written with the bit-code of the requester that last issued a Lock Request for the address.

If the remote requester is an I/O, no actions are taken for the remote requester because a lock denied signal will be issued by the remote Lock Register Control.

If the local requester is an IP, it must wait for the lock. The Request Forward Bits of the lock register of the requester that last issued a Lock Request for the address are written with the bit-code of the local requester. The Request Backward bits of the lock register of the local requester are written with the bit-code of the requester that last issued a Lock Request for the address. Note that the remote requester will be the requester that last issued a Lock Request for the address if the remote requester is an IP.

If the local requester is an I/O, a lock denied signal is returned to the local I/O Subsystem.

Local Lock/Remote Release Conflict for an Unlocked Address

If the local requester wants to lock the same address that the remote requester is releasing and there are no other requesters waiting to lock the address, the Lock Register Control of the local Storage controller detects this condition and grants the lock to the local requester. The Lock Bit is set and the address is written in the lock register of the local requester. A lock granted signal is returned to the local requester. A similar sequence of actions occurs in the remote Lock Register Control if a local Lock Release and a remote Lock Request for the same address arrive at the same time.

Local Lock/Remote Release Conflict for a Locked Address

If the local requester wants to lock the same address that the remote requester is releasing and there are other requesters waiting to lock the address, the condition is detected by the Lock Register Control logic circuit. If the local requester is an IP, it must wait for the lock to be granted. The Request Forward Bits of the lock register of the requester that last issued a lock request for the address are written with the bit-code of the local requester. The Request Backward bits of the lock register of the local lock requester are written with the bit-code of the requester that last issued a lock request for the address. If the local requester is the I/O Subsystem, a lock denied signal is routed to the I/O Subsystem.

The Lock Release from the remote requester is processed in parallel with the queuing of the lock request from the local requester. The Lock Bit is set and the Request Backward Bits are cleared in the lock register of the requester referenced by the Request Forward Bits of the lock register of the remote requester. In addition, the Request Forward Bits are cleared in the lock register of the remote requester. If the lock register in which the Locked Bit was set is associated with a local requester, a lock granted signal is returned to the requester. A similar sequence of actions occurs in the remote Lock Register Control if a local Lock Release and a remote Lock Request for the same address arrive at the same time.

Figure 8:
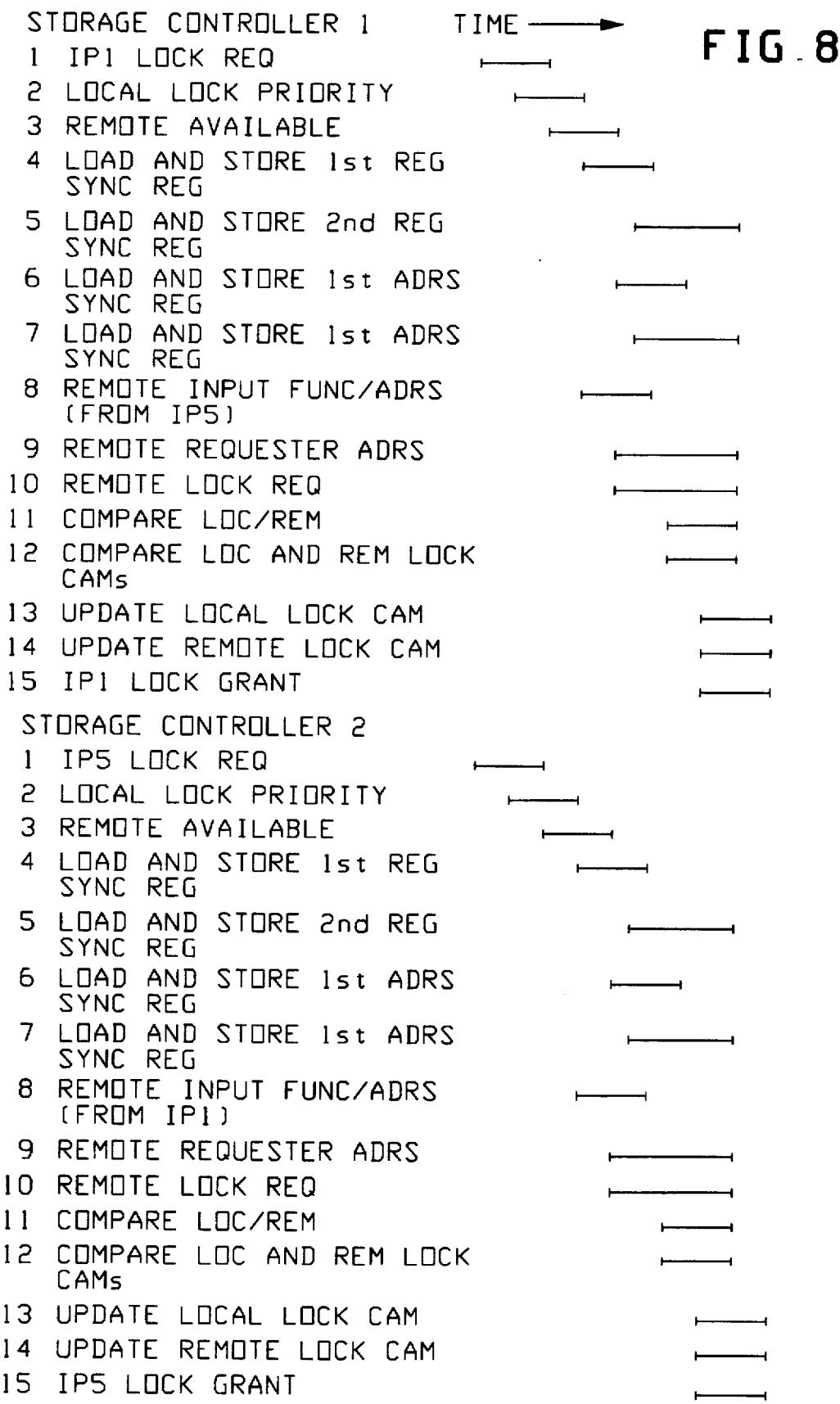
FIG. 8 is a timing diagram that illustrates simultaneous Lock Requests from IP1 and IP5 of the exemplary data processing system of FIG. 1, where each of the Lock Requests references a different address.

FIG. 8 is a timing diagram that illustrates simultaneous Lock Requests from IP1 and IP5 of the exemplary data processing system of FIG. 1, where each of the Lock Requests references a different address. The example illustrates that the locks may be granted in parallel. The length of the timing marks is only intended to illustrate the relative times that the indicated actions take place. The top half of the timing diagram sets forth the actions taken in Storage Controller 1 for the local Lock Request from IP1 and the remote Lock Request from IP5, and the bottom half of the timing diagram sets forth the actions taken in Storage Controller 2 for the local Lock Request from IP5 and the remote Lock Request from IP1. The labeled actions correspond to the various logic circuits of FIGS. 1–4 and are self-explanatory.

We claim:

1. A storage lock management apparatus for use in a multiprocessor data processing system that includes a plurality of processors, each of which is for issuing storage lock function codes for locking and releasing locks on selectable portions of shared addressable memory, the system further including two intercoupled storage controllers, each providing access to a portion of the shared addressable memory and intercoupled via a remote interface, wherein predetermined ones of the plurality of processors are directly coupled to a respective one of the storage controllers, the storage lock management apparatus in each of the storage controllers comprising:

a set of lock-registers, wherein each lock-register is associated with a respective one of the plurality of processors and is for indicating which of the selectable portions of shared addressable memory is locked by said respective one of the plurality of processors;

a lock priority circuit coupled to the predetermined ones of the plurality of processors, whereby storage lock function codes are received from the predetermined ones of the plurality of processors;

a lock-register control circuit coupled to said lock priority circuit, coupled to said set of lock-registers, and coupled to the remote interface whereby a lock function code presented on the remote interface bypasses said lock priority circuit and is processed in parallel with a lock function code received from said lock priority circuit, and whereby locks are granted to the predetermined ones of the plurality of processors;

a synchronization circuit coupled to said lock priority circuit, coupled to said lock-register control circuit, and coupled to the remote interface for synchronizing presentation of a storage lock operation, initiated by one of the predetermined ones of the plurality of processors that are directly coupled to the respective one of the storage controllers, to said lock priority circuit with receipt of said storage lock operation by a lock-register control circuit in the intercoupled storage controller.

2. The lock management apparatus of claim 1, further comprising:

a local-remote priority circuit coupled to the remote interface and coupled to said synchronization circuit for prioritizing a storage lock function code received on the remote interface and a simultaneous storage lock function code presented by said synchronization circuit where an address of said storage lock function code received on the remote interface has a predetermined relationship to an address of said storage lock function code presented by said synchronization circuit.

3. The lock management apparatus of claim 2, further comprising:

a queue control circuit coupled to said lock-register control circuit and coupled to said set of lock-registers to maintain a queue of lock requests from the predetermined ones of the processors waiting to be granted a lock for the selectable portions of shared addressable memory.

4. A storage lock management apparatus for use in a multiprocessor data processing system that includes a plurality of processors, each of which is for initiating storage lock operations for granting and releasing locks on portions of shared addressable memory, the system further including a plurality of intercoupled storage controllers, each providing access to a portion of addressable memory and intercoupled via a remote interface, wherein predetermined ones of the plurality of processors are directly coupled to a respective one of the storage controllers, the storage lock management apparatus comprising:

- a plurality of sets of lock-registers, a respective one of said sets in each of the storage controllers, wherein each said lock-register is associated with a respective one of the plurality of processors and is for indicating which of the portions of shared addressable memory is locked by said respective one of the plurality of processors;
- a plurality of lock priority circuits, a respective one of said lock priority circuits in each of the storage controllers, wherein each of said lock priority circuits is coupled to the predetermined ones of the processors that are directly coupled to the respective one of the storage controllers, whereby storage lock operations are received from the predetermined ones of the processors;
- a plurality of lock-register control circuits, a respective one of said lock-register control circuits in each of the storage controllers, and coupled to a respective one of said lock priority circuits and coupled to a respective one of said sets of lock-registers, whereby locks on the selectable portions of shared addressable memory are granted to the predetermined ones of the processors;
- a plurality of synchronization circuits, a respective one of said synchronization circuits in each of the storage controllers and coupled to a respective one of said lock priority circuits, coupled to a respective one of said lock-register control circuits, and coupled to the remote interface to synchronize presentation of a storage lock operation, initiated by one of the predetermined ones of the processors that are directly coupled to the respective one of the storage controllers, to said respective lock priority circuit with receipt of the storage lock operation by others of said second lock-register control circuits.

5. The lock management apparatus of claim 4, further comprising:

- a prioritization circuit in each of the storage controllers, and coupled to the remote interface and coupled to a respective one of said synchronization circuits to prioritize a storage lock operation presented on the remote interface and a simultaneous storage lock operation presented by said respective one of said synchronization circuits where an address of said storage lock operation presented on the remote interface has a predetermined relationship to an address of said storage lock operation presented by said respective one of said synchronization circuits.

6. The lock management apparatus of claim 5, further comprising:

- a queue control circuit in each of the storage controllers, and coupled to a respective one of said lock-register control circuits and coupled to a respective one of said sets of lock-registers to maintain a queue of the predetermined ones of the plurality of processors waiting to be granted a lock for a single address.

7. A storage lock management apparatus for use in a multiprocessor data processing system that includes a first plurality of processors coupled to a first storage controller, a second plurality of processors coupled to a second storage controller, wherein the first storage controller is coupled to the second storage controller via a remote interface, and first and second memory subsystems respectively coupled to the first and second storage controllers, wherein the first and second memory subsystems comprise the addressable memory space of the system, and the first and second memory subsystems are each accessible by the both the first and second plurality of processors, the storage lock management apparatus comprising:

- a first set of lock-registers, wherein each lock-register in said first set is associated with a first respective one of the first plurality of processors and the second plurality of processors and indicates which address within the addressable memory space of the system is locked by said first respective one of the processors;
- a second set of lock-registers, wherein each lock-register in said second set is associated with a second respective one of the first plurality of processors and the second plurality of processors and indicates which address within the addressable memory space of the system is locked by said second respective one of the processors;
- a first lock priority circuit coupled to each of the first plurality of processors for receiving storage lock operations from the first plurality of processors;
- a second lock priority circuit coupled to each of the second plurality of processors for receiving storage lock operations from the second plurality of processors;
- a first lock-register control circuit coupled to said first lock priority circuit and coupled to said first set of lock-registers for granting said storage lock operations from the first plurality of processors;
- a second lock-register control logic circuit coupled to said second lock priority circuit and coupled to said second set of lock-registers for granting said storage lock operations from the second plurality of processors;
- a first synchronization circuit coupled to said first lock priority circuit, coupled to said first lock-register control circuit, and coupled to the remote interface for synchronizing presentation of a storage lock operation, initiated by one of the first plurality of processors, to said first lock priority circuit with receipt of the storage lock operation provided by said second lock-register control circuit, whereby said first lock-register control circuit processes in parallel said storage lock operation initiated by said one of the first plurality of processors and said storage lock operation provided by said second lock-register control circuit; and
- a second synchronization circuit coupled to said second lock priority circuit, coupled to said second lock-register control circuit, and coupled to the remote interface for synchronizing presentation of a storage lock operation, initiated by one of the second plurality of processors, to said second lock priority circuit with receipt of the storage lock operation provided by said first lock-register control circuit, whereby said second lock-register control circuit processes in parallel said storage lock operation initiated by said one of the second plurality of processors and said storage lock operation provided by said first lock-register control circuit.

8. The lock management apparatus of claim 7, further comprising:

- a first prioritization circuit coupled to the remote interface and coupled to said first synchronization circuit for prioritizing a lock operation presented on the remote interface and a simultaneous lock operation presented by said first synchronization circuit where an address of said lock operation presented on the remote interface has a predetermined relationship to an address of said lock operation presented by said first synchronization circuit;

a second prioritization circuit coupled to the remote interface and coupled to said second synchronization circuit for prioritizing, consistent with said first prioritization circuit, a lock operation presented on the remote interface and a simultaneous lock operation presented by said second synchronization circuit where an address of said lock operation presented on the remote interface has a predetermined relationship to an address of said lock operation presented by said second synchronization circuit.

9. The lock management apparatus of claim 8, further comprising:

a first queue control circuit coupled to said first lock-register control circuit and coupled to said first set of lock-registers for maintaining a queue of processors waiting to be granted a lock for a single address;

a second queue control circuit coupled to said second lock-register control circuit and coupled to said second set of lock-registers for maintaining a queue of processors waiting to be granted a lock for a single address.

10. A parallel priority queue apparatus for use in managing storage locks in a multiprocessor data processing system that includes a plurality of processors, each for of issuing storage lock function codes for locking and releasing locks on selectable portions of shared addressable memory and memory access function codes for reading and writing to the addressable memory, the system further including two intercoupled storage controllers, each providing access to a portion of addressable memory, having a second-level cache, and intercoupled via a remote interface, wherein predetermined ones of the plurality of processors are directly coupled to a respective one of the storage controllers, the parallel priority queue apparatus in each of the storage controllers comprising:

a second-level cache priority circuit coupled to the predetermined ones the processors and coupled to the second level cache, for of receiving memory access function codes from the predetermined ones of the processors;

a lock priority circuit coupled to the predetermined ones of the processors and coupled to said second level cache priority circuit, for of receiving storage lock function codes directly from the predetermined ones of the processors and lock release function codes from said second-level cache priority circuit;

a lock control circuit coupled to said lock priority circuit and coupled to the predetermined ones of the processors, for of receiving and processing storage lock function codes and granting and releasing locks on the selectable portions of addressable memory.

11. The parallel priority queue apparatus of claim 10, further comprising:

a remote output priority circuit coupled to said lock priority circuit and coupled to the second level cache, for of receiving storage lock function crates from said lock priority circuit and memory access function codes from the second level cache, whereby storage lock function codes from the predetermined ones of the processors are capable of bypassing the second level cache enroute to the other storage controller.

12. A storage lock management apparatus for use in a multiprocessor data processing system that includes a plurality of processors, each of which is for issuing storage lock function codes for locking and releasing locks on selectable portions of shared addressable memory and memory access function codes for reading and writing to the addressable memory, the system further including two intercoupled storage controllers, each having a second level cache and providing access to a predetermined portion of addressable memory and intercoupled via a remote interface, wherein predetermined ones of the plurality of processors are directly coupled to a respective one of the storage controllers, the storage lock management apparatus in each of the storage controllers comprising:

a second-level cache priority circuit coupled to the predetermined ones the processors and coupled to the second level cache, for receiving memory access function codes from the predetermined ones of the processors;

a lock priority circuit coupled to the predetermined ones of the processors and coupled to said second level cache priority circuit, for receiving storage lock function codes directly from the predetermined ones of the processors;

a lock control circuit coupled to said lock priority circuit and coupled to the predetermined ones of the processors, for receiving and processing storage lock function codes and granting and releasing locks on the selectable portions of addressable memory;

a set of lock-registers, wherein each lock-register is associated with a respective one of the plurality of processors and is for indicating which address is locked by the respective one of the processors;

a lock-register control circuit coupled to said lock priority circuit and coupled to said set of lock-registers;

a synchronization circuit coupled to said lock priority circuit, coupled to said lock-register control circuit, and coupled to the remote interface for synchronizing presentation of a storage lock operation, initiated by one of the predetermined ones of the processors that are directly coupled to the respective one of the storage controllers, to said lock priority circuit with receipt of the storage lock operation by a lock-register control circuit in the other storage controller.

13. The lock management apparatus of claim 12, wherein said lock priority circuit comprises:

a lock request priority circuit coupled to the predetermined ones of the processors and for of receiving from the predetermined ones of the processors storage lock function codes for locking specified portions of addressable memory and selecting one of the storage lock function codes according to a predetermined priority;

a lock release priority circuit coupled to said second-level cache priority circuit and for of receiving from said second-level cache priority circuit storage lock function codes for releasing a lock on specified portions of addressable memory and selecting one of the storage lock function codes according to a predetermined priority; and and a request-release priority circuit coupled to said lock request priority circuit and coupled to said lock release priority circuit, for of selecting between a storage lock function code from said lock request priority circuit and a storage lock function code from said lock release priority circuit.

14. A storage lock management apparatus for use in a multiprocessor data processing system that includes a plurality of processors, each of which is for issuing storage lock function codes for granting and releasing locks on selectable portions of shared addressable memory, the system further including two intercoupled storage controllers, each providing access to a portion of the shared addressable memory and intercoupled via a remote interface, wherein predetermined ones of the plurality of processors are directly coupled to a respective one of the storage controllers, the storage lock management apparatus in each of the storage controllers comprising:

- a set of lock-register means associated with the plurality of processors for indicating which of the selectable portions of shared addressable memory is locked by said associated plurality of processors;
- lock priority means coupled to the predetermined ones of the plurality of processors, for receiving storage lock function codes from the predetermined ones of the plurality of processors;
- lock-register control means coupled to said lock priority means, coupled to said lock-register means, and coupled to the remote interface, for receiving a lock function code directly from the remote interface and for processing said lock function code in parallel with a lock function code received from said lock priority means, and for granting and releasing locks on selectable portions of shared addressable memory to the predetermined ones of the plurality of processors;
- synchronization means coupled to said lock priority means, coupled to said lock-register control means, and coupled to the remote interface for synchronizing presentation to said lock priority means of a storage lock operation initiated by one of the predetermined ones of the plurality of processors that are directly coupled to the respective one of the storage controllers with receipt of said storage lock operation by a lock-register control means in the intercoupled storage controller.

15. The lock management apparatus of claim 14, and further including:

local-remote priority means coupled to the remote interface and coupled to said synchronization means for prioritizing a storage lock function code received on the remote interface and a simultaneous storage lock function code presented by said synchronization means where an address of said storage lock function code received on the remote interface has a predetermined relationship to an address of said storage lock function code presented by said synchronization means.

16. The lock management apparatus of claim 15, and further including:

queue means coupled to said lock-register control means and coupled to said lock-register means for storing lock requests from the predetermined ones of the processors having a lock operation pending to one of the selectable portions of shared addressable memory.

* * * * *

UNITED STATES PATENT AND TRADEMARK OFFICE
CERTIFICATE OF CORRECTION

PATENT NO. : 5,678,026
DATED : October 14, 1997
INVENTOR(S) : Kelvin S. Vartti
              Mitchell A. Bauman It is certified that error appears in the above-identified patent and that said Letters Patent is hereby corrected as shown below:

Column 19, Line 29   Delete "of" between "for" and "issuing".

Column 19, Line 43   Delete "of" between "for" and "receiving".

Column 19, Line 48   Delete "of" between "for" and "receiving".

Column 19, Line 54   Delete "of" between "for" and "receiving".

Column 19, Line 61   Delete "of" between "for" and "receiving".

Column 19, Line 61   Replace "crates" with --codes--.

Column 20, Line 47   Delete "of" between "for" and "receiving".

Column 20, Line 53   Delete "of" between "for" and "receiving".

Column 20, Line 61   Delete "of" between "for" and "selecting".

Signed and Sealed this

Third Day of February, 1998

Attest:

BRUCE LEHMAN

Attesting Officer

Commissioner of Patents and Trademarks